United States Patent
Kuroda et al.

(10) Patent No.: US 7,539,113 B2
(45) Date of Patent: May 26, 2009

(54) INFORMATION RECORDING APPARATUS AND COMPUTER PROGRAM

(75) Inventors: Kazuo Kuroda, Saitama (JP); Toshiro Tanikawa, Saitama (JP); Eiji Muramatsu, Saitama (JP)

(73) Assignee: Pioneer Corporation, Tokyo (JP)

( * ) Notice: Subject to any disclaimer, the term of this patent is extended or adjusted under 35 U.S.C. 154(b) by 312 days.

(21) Appl. No.: 10/577,226

(22) PCT Filed: Aug. 26, 2005

(86) PCT No.: PCT/JP2005/015578

§ 371 (c)(1),
(2), (4) Date: Jun. 26, 2006

(87) PCT Pub. No.: WO2006/025287

PCT Pub. Date: Mar. 9, 2006

(65) Prior Publication Data

US 2007/0127345 A1    Jun. 7, 2007

(30) Foreign Application Priority Data

Aug. 30, 2004    (JP)    ............ 2004-250486

(51) Int. Cl.
   *G11B 7/00*    (2006.01)
(52) U.S. Cl. .................... 369/94; 369/53.24; 369/275.3
(58) Field of Classification Search ............ 369/53.24
   See application file for complete search history.

(56) References Cited

U.S. PATENT DOCUMENTS

| | | | | |
|---|---|---|---|---|
| 6,970,409 B2 * | 11/2005 | Araki et al. | ............ | 369/53.24 |
| 6,996,049 B2 * | 2/2006 | Kuroda | ............ | 369/59.25 |
| 7,068,578 B2 * | 6/2006 | Matsuba | ............ | 369/53.24 |
| 7,355,940 B2 * | 4/2008 | Yonezawa | ............ | 369/47.42 |
| 2002/0085467 A1 * | 7/2002 | Noborimoto et al. | ...... | 369/53.22 |
| 2002/0110068 A1 * | 8/2002 | Araki et al. | ............ | 369/53.24 |
| 2003/0103431 A1 * | 6/2003 | Kuroda | ............ | 369/59.25 |

FOREIGN PATENT DOCUMENTS

| | | |
|---|---|---|
| EP | 1 231 601 | 8/2002 |
| EP | 1 258 868 A2 | 11/2002 |
| EP | 1 837 865 A1 | 9/2007 |
| JP | 2000-311346 | 11/2000 |
| JP | 2002-216361 | 8/2002 |
| JP | 2002-237050 | 8/2002 |
| JP | 2004-519810 | 7/2004 |
| WO | 02/075728 | 9/2002 |

* cited by examiner

*Primary Examiner*—Wayne R Young
*Assistant Examiner*—Van N Chow
(74) *Attorney, Agent, or Firm*—Young & Thompson

(57) ABSTRACT

An information recording apparatus (300) is provided with: a recording device (352) for recording record information into a first or second recording layer by irradiating thereon laser light; a first controlling device (354) for controlling the recording device to record the record information into a first object area of the second recording layer which faces a recorded area of the first recording layer; and a second controlling device (354) for controlling the recording device to record the record information into a second object area of the second recording layer which faces an unrecorded area of the first recording layer smaller than a predetermined width, out of an unrecorded area whose both ends are adjacent to the recorded area.

13 Claims, 13 Drawing Sheets

[FIG. 1]
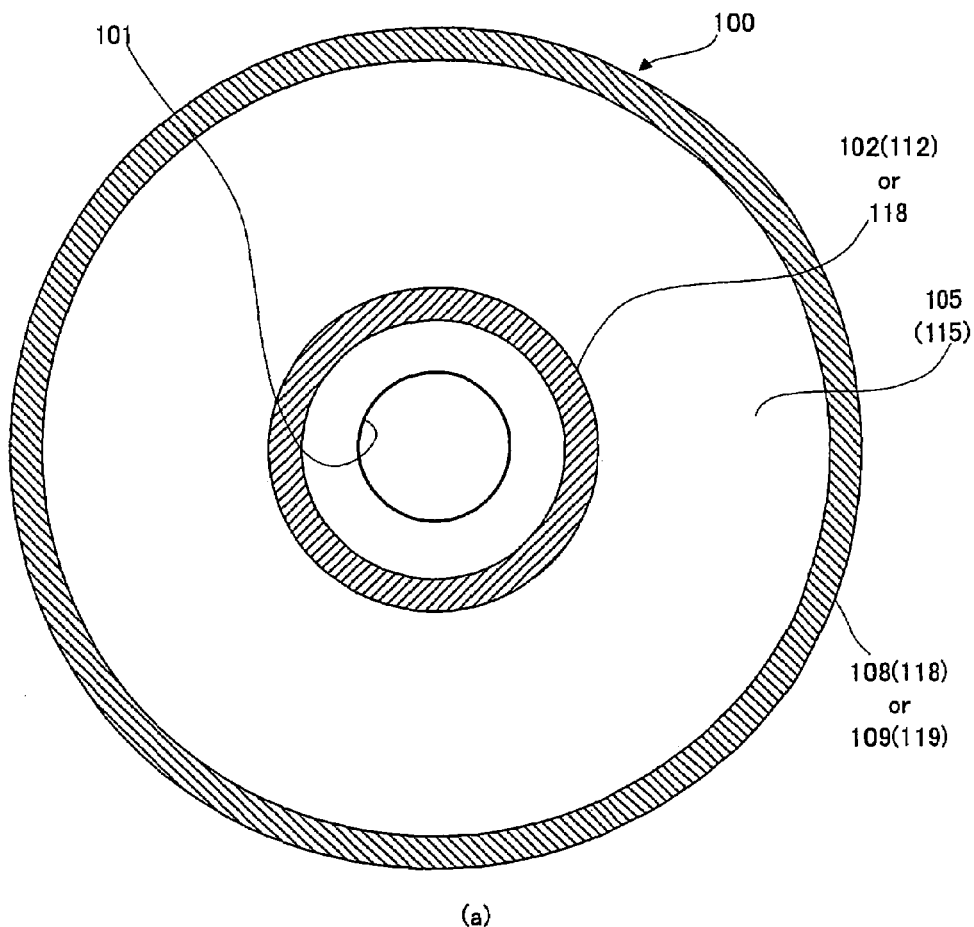
(a)
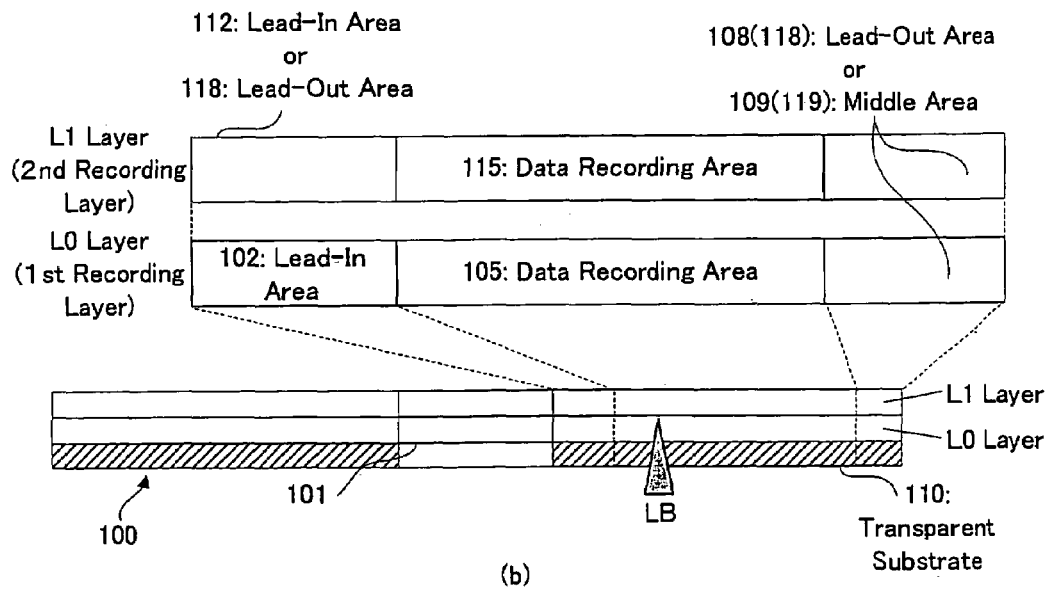
(b)

[FIG. 2]
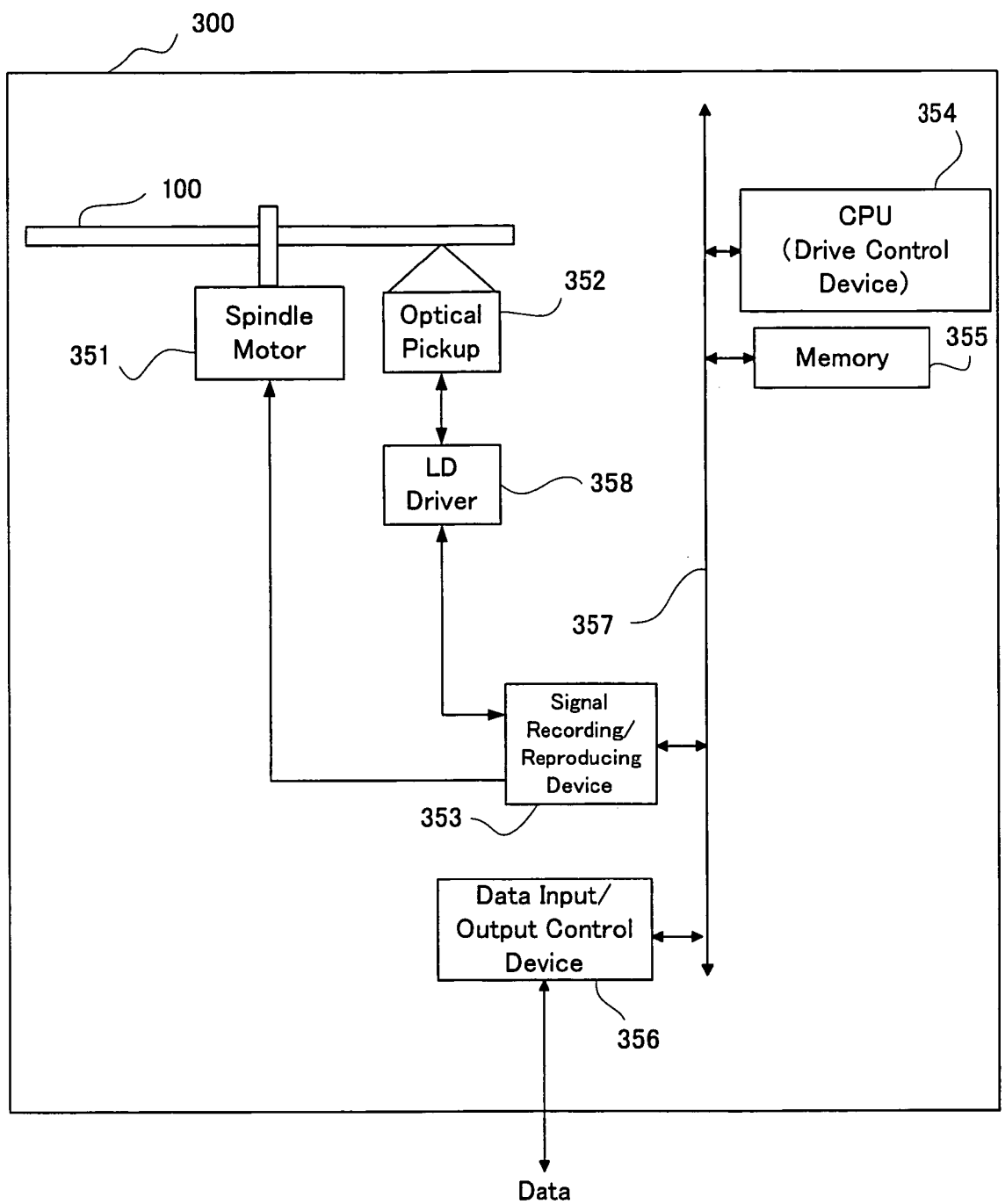

[FIG. 3]
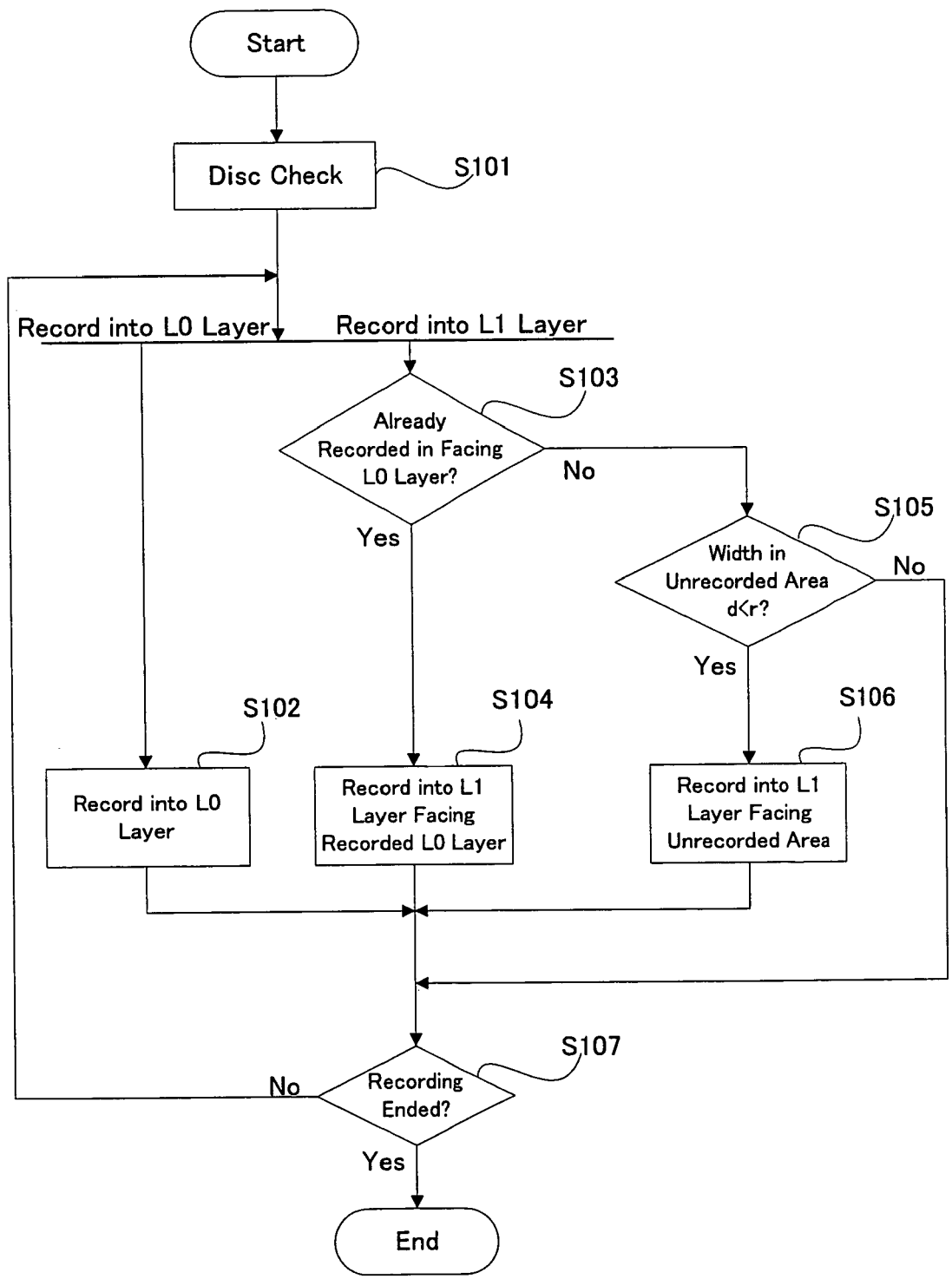

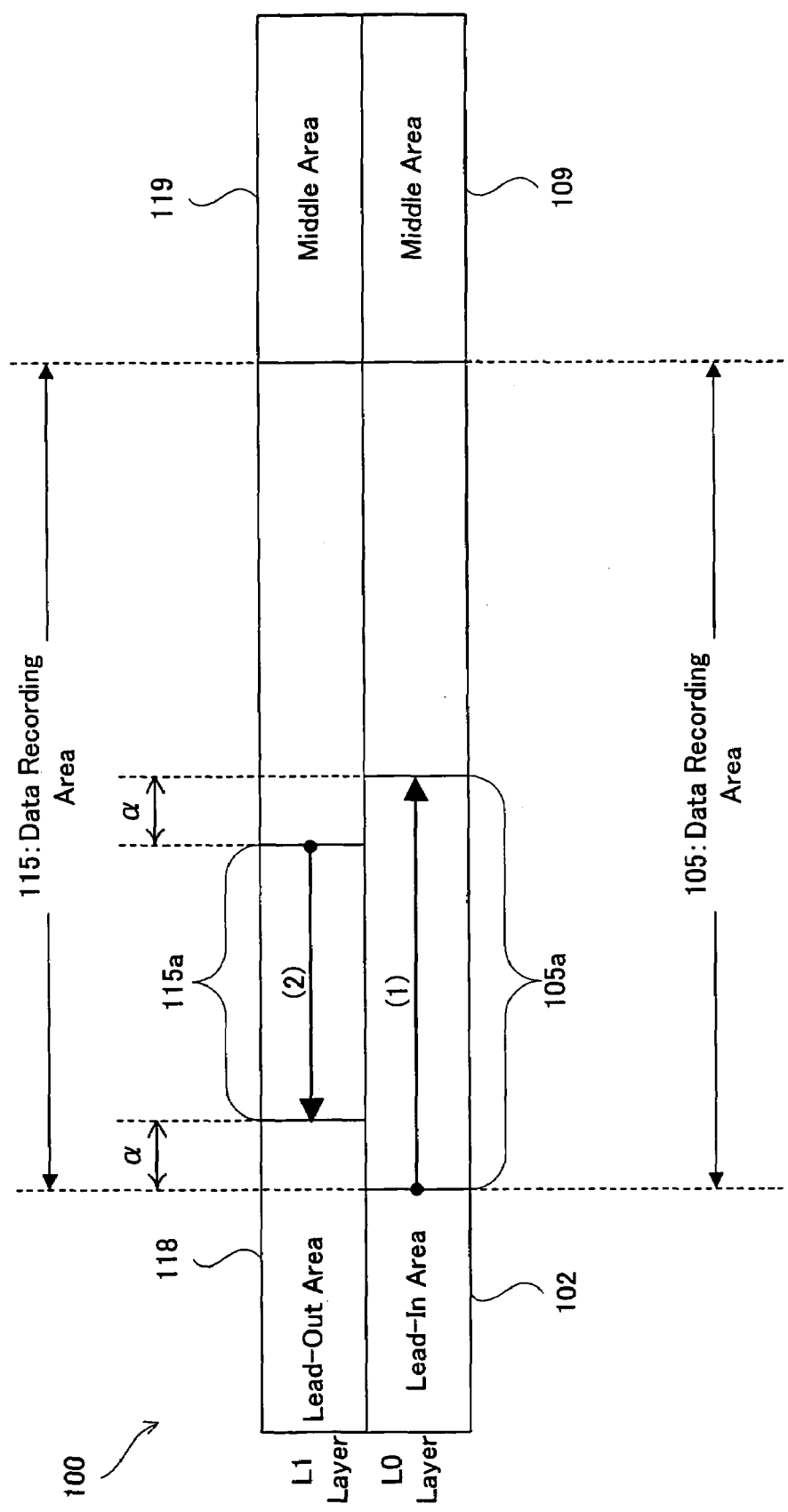
[FIG. 4]

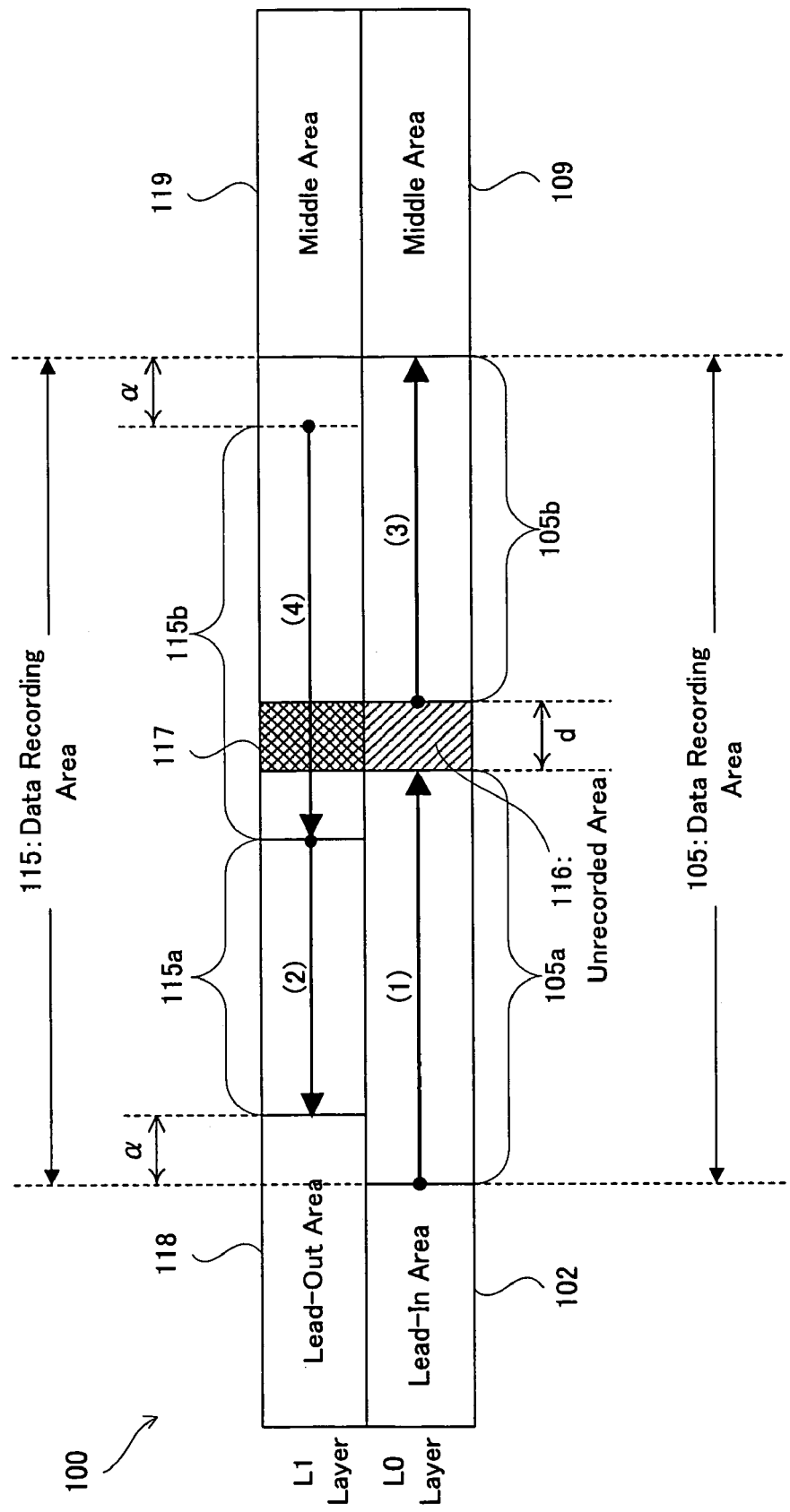
[FIG. 5]

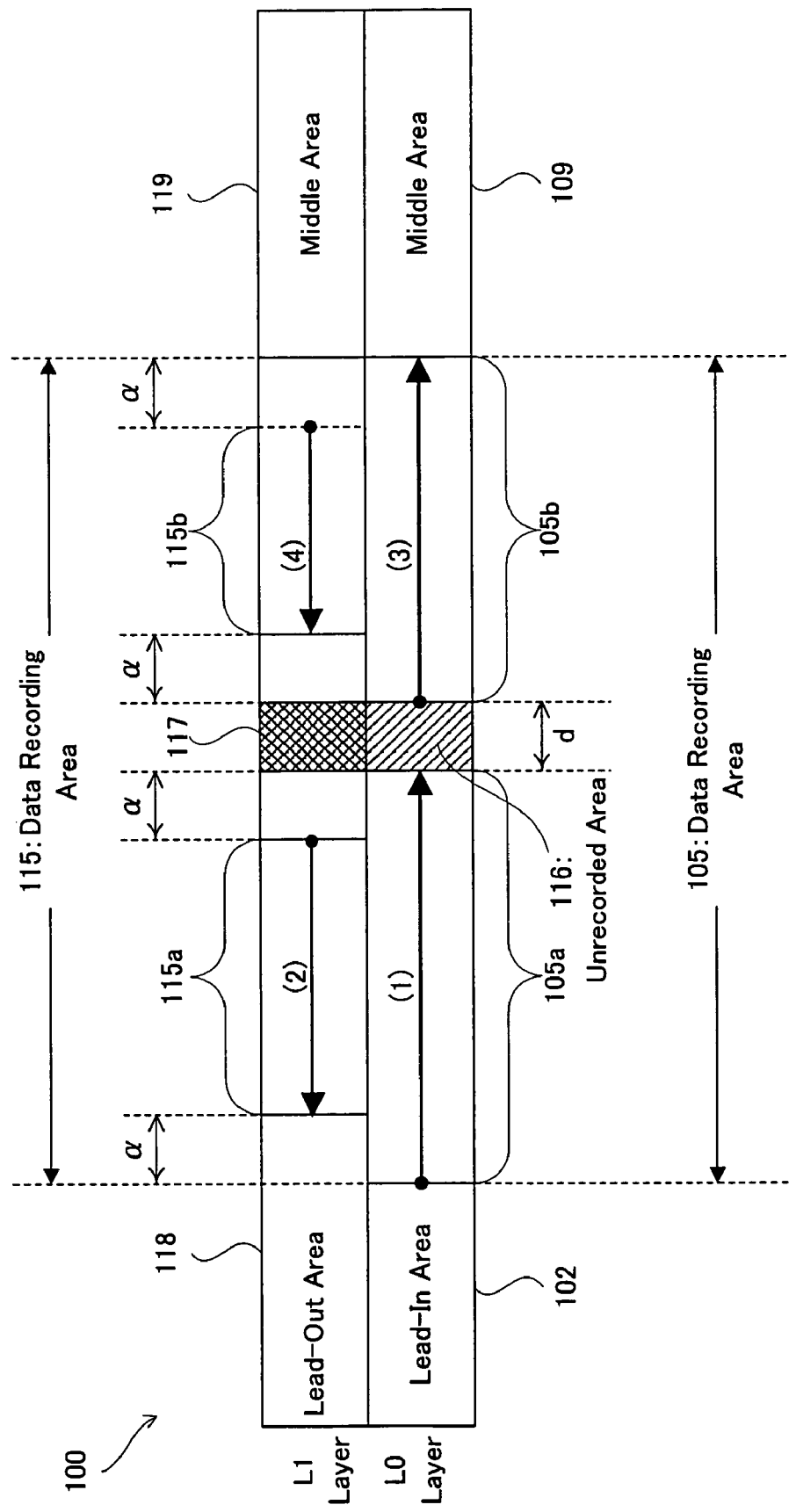
[FIG. 6]

[FIG. 7]
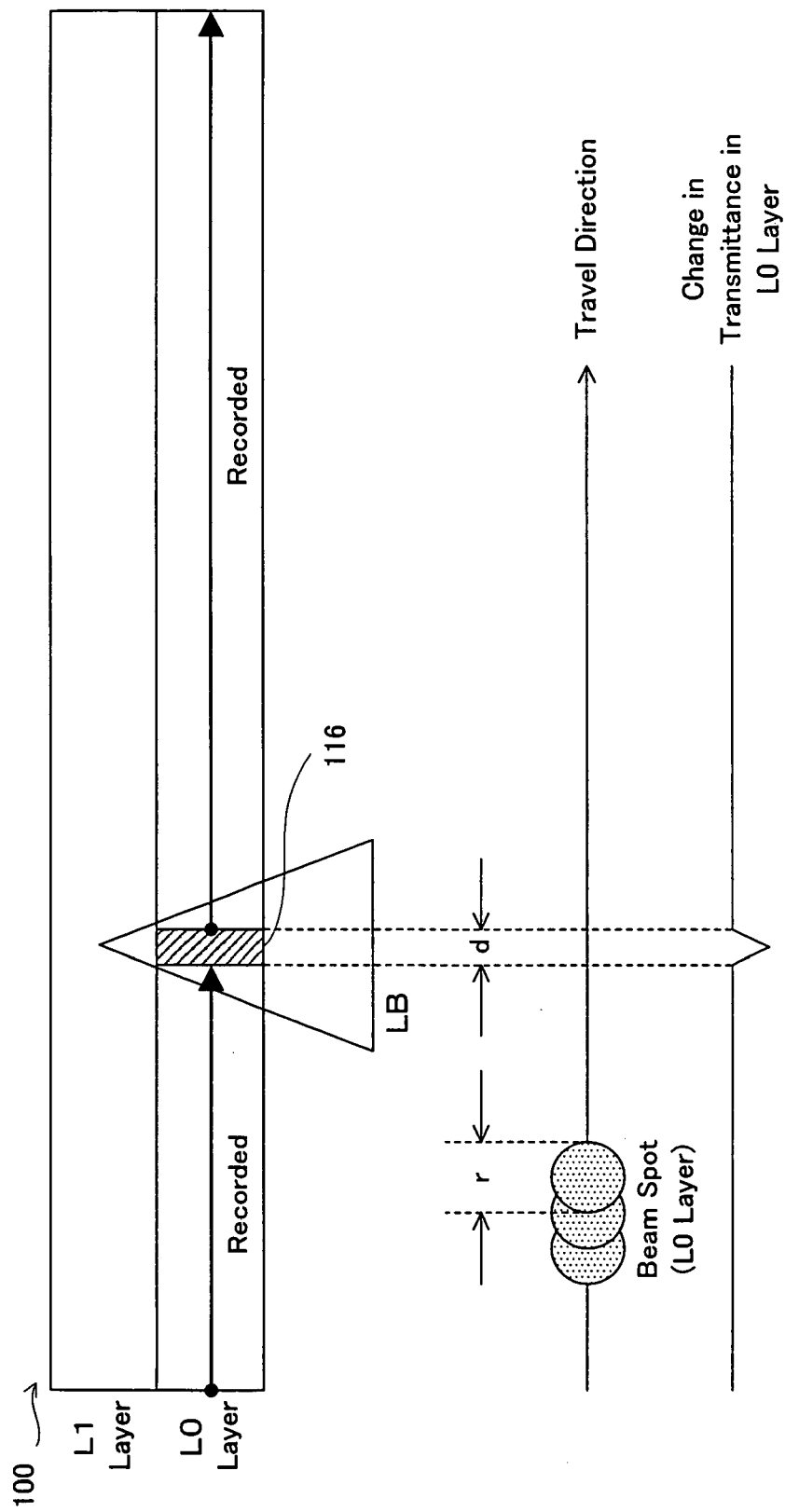

[FIG. 8]
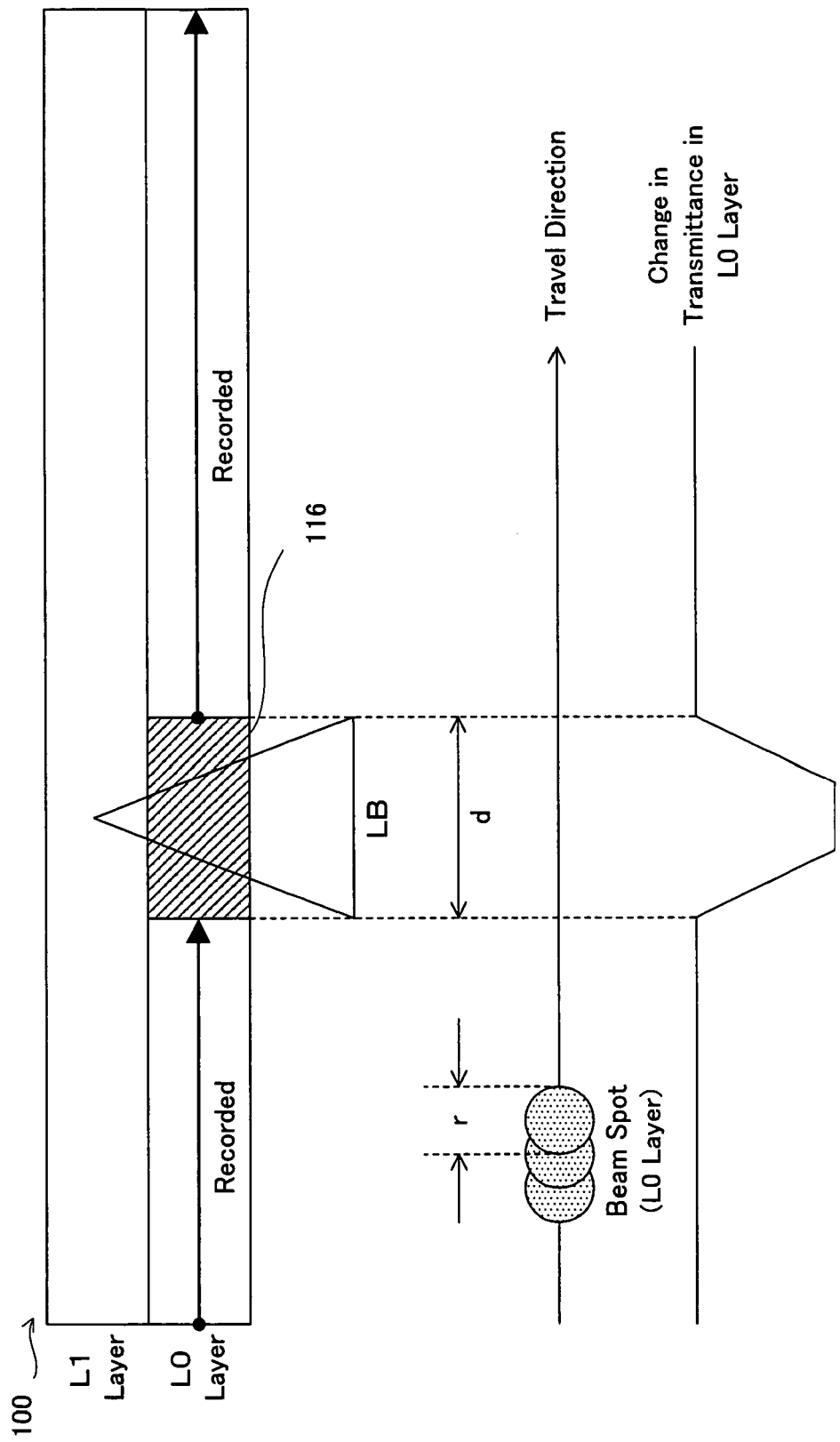

[FIG. 9]
Groove Track in L0 Layer
Beam Spot (L0 Layer)
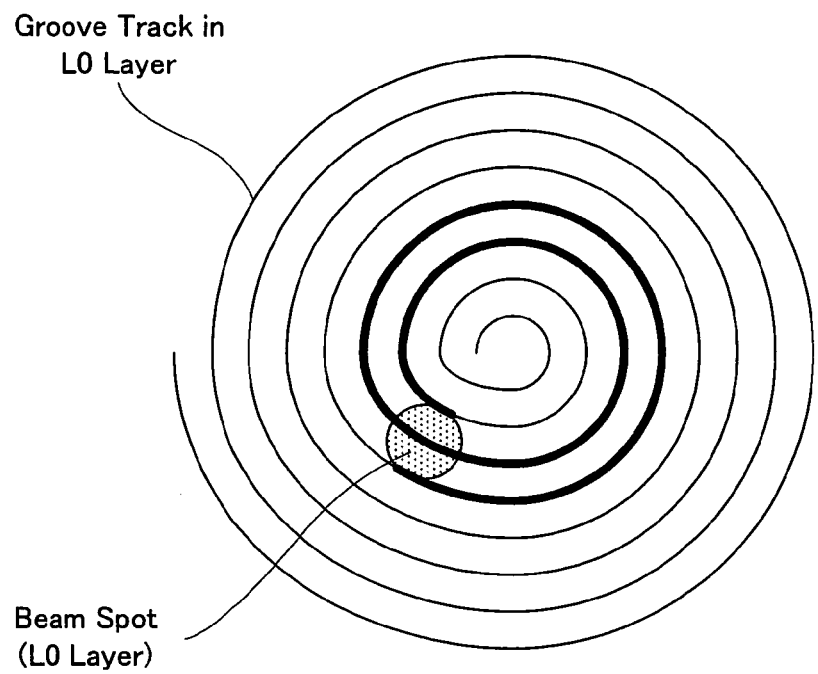
[FIG. 10]
120a: Size Information
| Data Size |
|---|
| 1.5MB |
(a)
120b: Size Information
| Recording Position | Data Size |
|---|---|
| Inner (add:N1-N2) | 1.5MB |
| Intermediate (add:N2-N3) | 3.0MB |
| Outer (add:N3-N4) | 4.5MB |
(b)

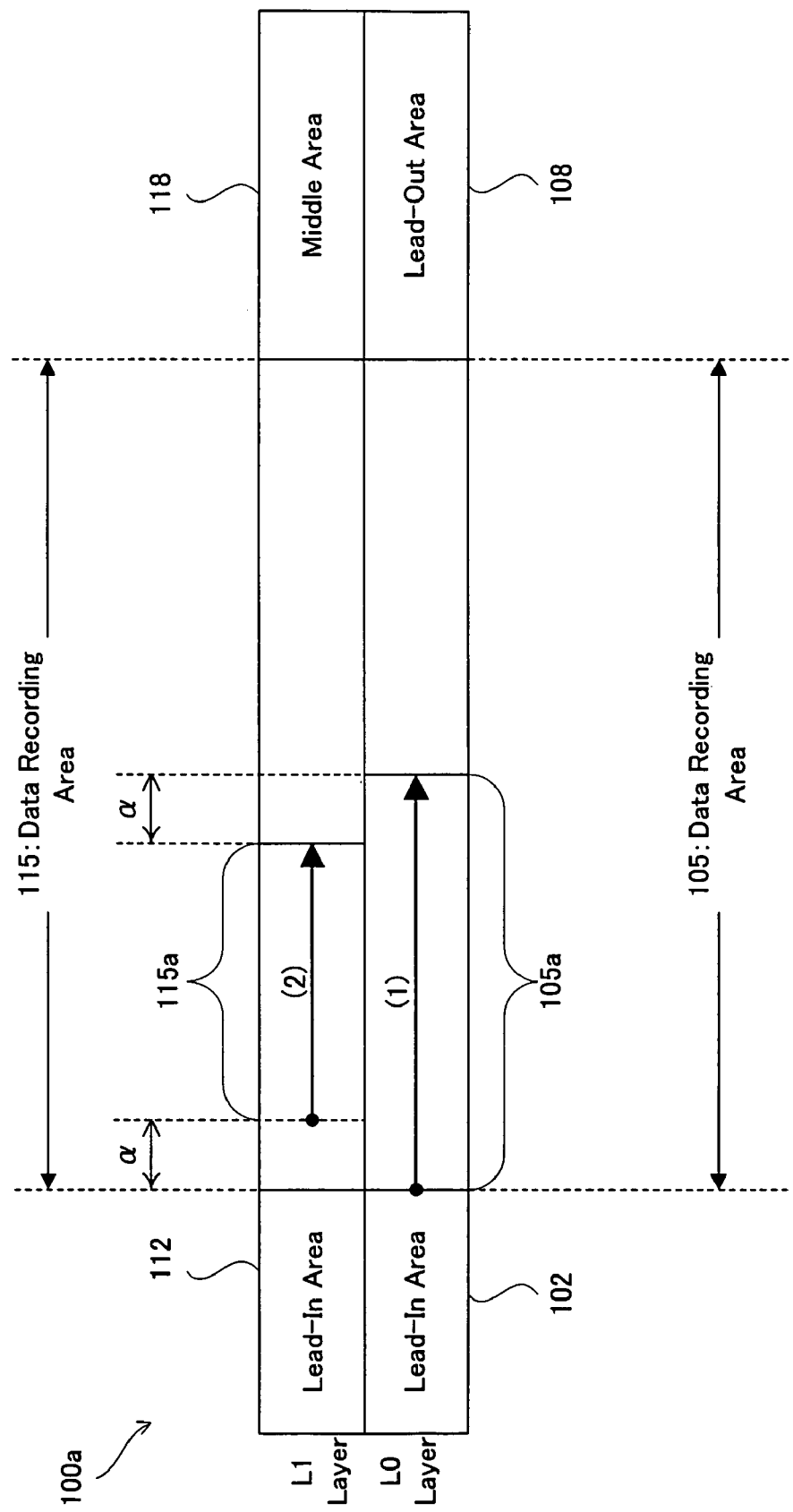
[FIG. 11]

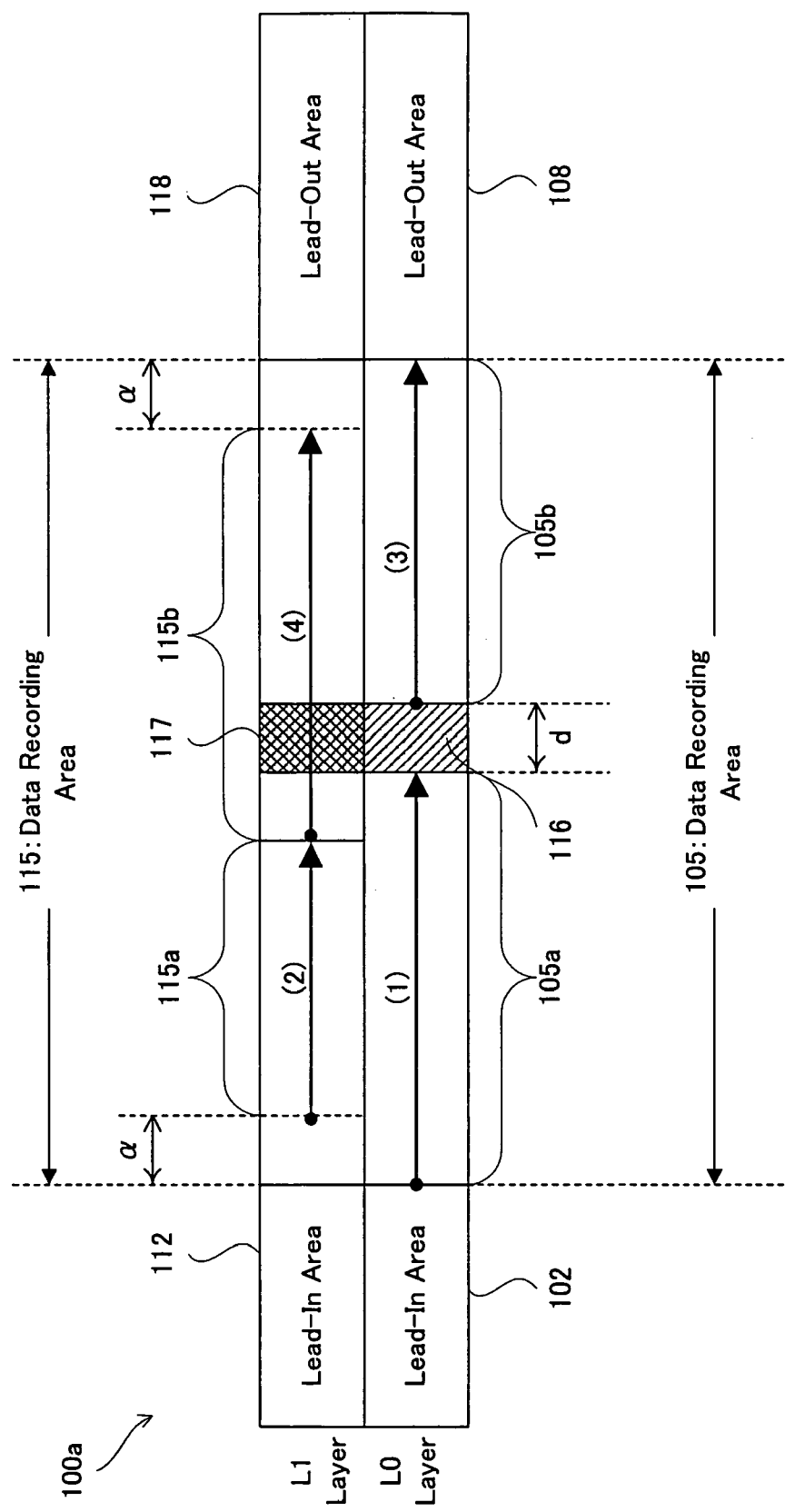
[FIG. 12]

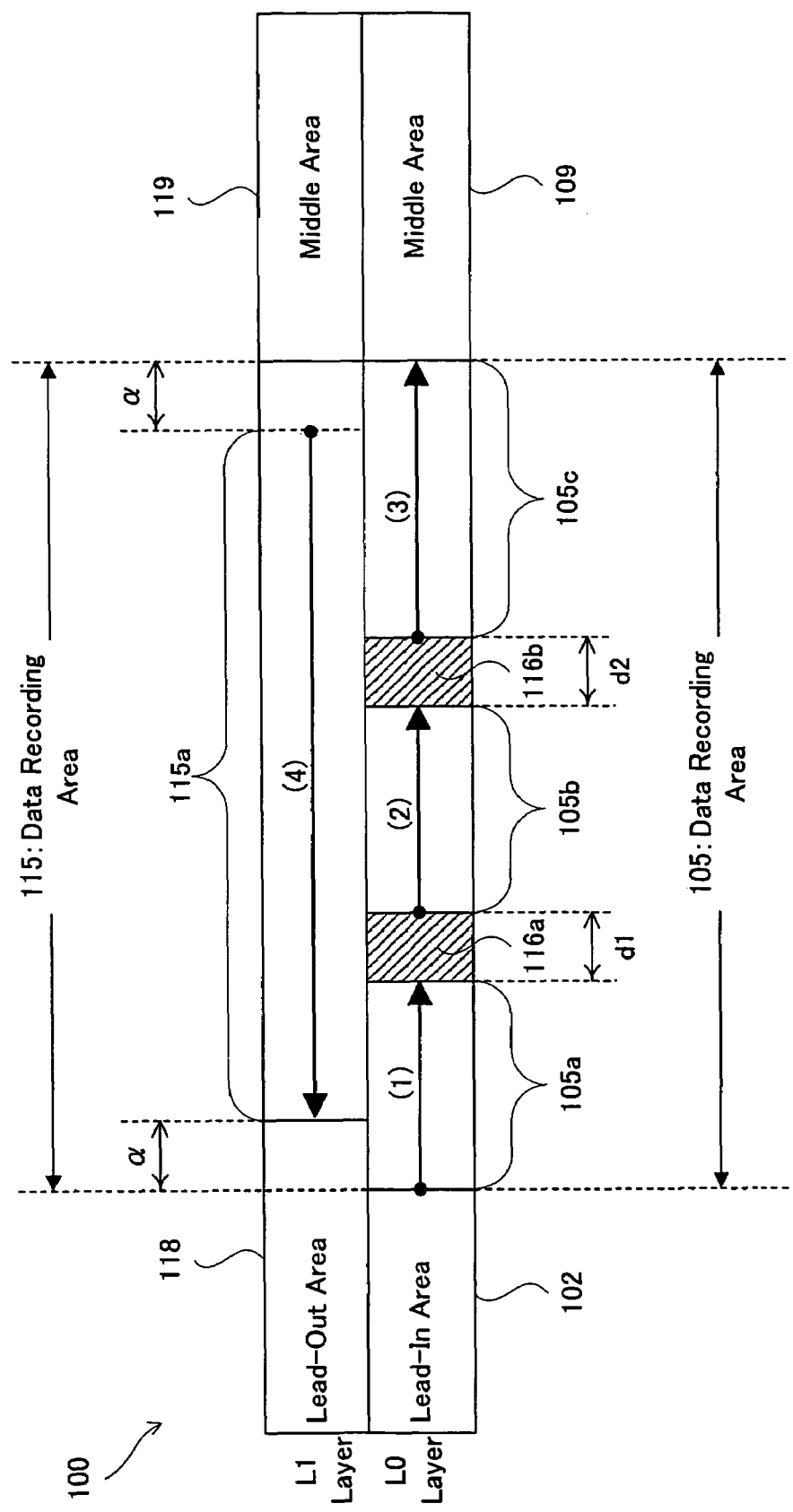
[FIG. 13]

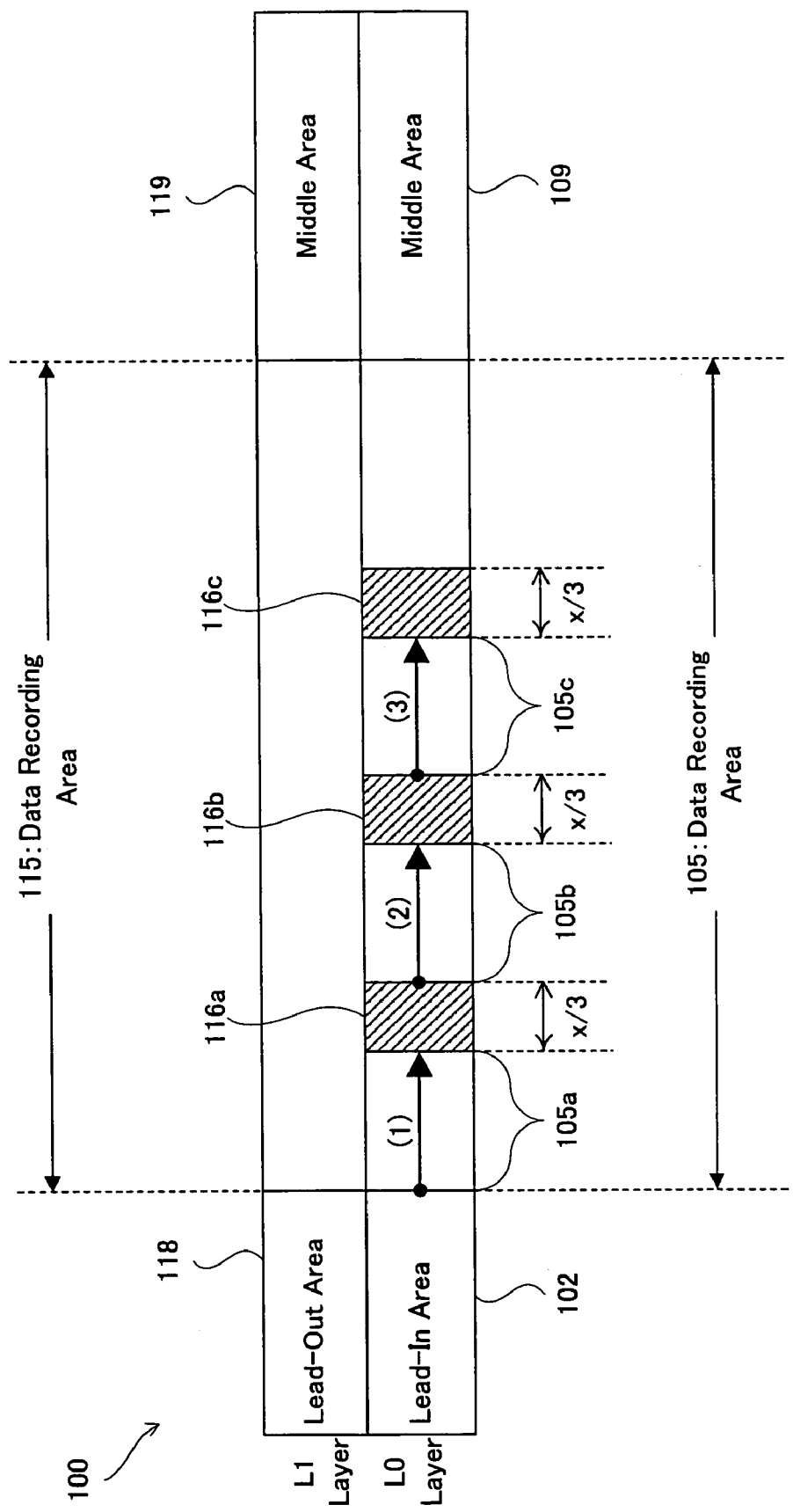
[FIG. 14]

INFORMATION RECORDING APPARATUS AND COMPUTER PROGRAM

TECHNICAL FIELD

The present invention relates to an information recording apparatus, such as a DVD recorder, and a computer program which makes a computer as the information recording apparatus.

BACKGROUND ART

For example, with respect to an information recording medium, such as a Compact Disc-Read Only Memory (CD-ROM), a Compact Disc-Recordable (CD-R), and a DVD-ROM, there has been also developed an optical disc of a multilayer type in which a plurality of recording layers are laminated on the same substrate. More specifically, a dual-layer type optical disc has a first recording layer which is on the nearest side viewed from the irradiation side of laser light in recording by an information recording apparatus (i.e. on the closest side to an optical pickup). The first recording layer is referred to as a "L0 layer", as occasion demands. Moreover, it has a semi-transparent reflective film located on the rear side of the first recording layer (i.e. on the farther side viewed from the irradiation side of the laser light). The dual-layer type optical disc has a second recording layer which is located on the rear side of the semi-transparent reflective film via a middle layer, such as an adhesion layer. The second recording layer is referred to as a "L1 layer", as occasion demands. Moreover, it has a reflective film located on the rear side of the second recording layer.

The information recording apparatus, such as a CD recorder, for recording record information onto the dual-layer type optical disc, uses an irreversible change recording method or a rewritable method by heat, by focusing (or irradiating) the laser light for recording on the L0 layer or the L1 layer.

Patent document 1: Japanese Patent Application Laying Open NO. 2000-311346

DISCLOSURE OF INVENTION

Subject to be Solved by the Invention

In the dual-layer type optical disc, if data is recorded into the L1 layer, it is necessary to irradiate the laser light through the L0 layer. In this case, the data may be or may not be recorded in the L0 layer through which the laser light passes. As described above, the recording state of the L0 layer is not necessarily same, and the condition of the laser light which is irradiated the L1 layer varies depending on the recording state of the L0 layer. Thus, there is such a technical problem that the data cannot be properly recorded into the L1 layer, depending on the recording state of the L0 layer.

In order to solve the above-mentioned conventional problems, it is therefore an object of the present invention to provide an information recording apparatus which can properly record information even onto an information recording medium having a plurality of recording layers, for example, as well as a computer program which makes a computer function as the information recording apparatus.

Means for Solving the Subject (Information Recording Apparatus and Method)

The above object of the present invention can be achieved by an information recording apparatus for recording record information onto an information recording medium provided with: a first recording layer on which the record information is recorded by irradiating thereon laser light; and a second recording layer on which the record information is recorded by irradiating thereon the laser light through the first recording layer, the information recording apparatus provided with: a recording device for recording the record information into the first recording layer or the second recording layer by irradiating thereon the laser light; a first controlling device for controlling the recording device to record the record information into a first object area which is a recording area of the second recording layer which faces a recorded area of the first recording layer in which the record information is already recorded; and a second controlling device for controlling the recording device to record the record information into a second object area which is a recording area of the second recording layer which faces an unrecorded area of the first recording layer smaller than a predetermined width, out of an unrecorded area whose both ends are adjacent to the recorded area.

According to the information recording apparatus of the present invention, by the operation of the recording apparatus, the record information is preferably recorded, into each of the first and second recording layers.

In particular, in the present invention, the recording device records the record information while being controlled by each of the first and second controlling devices. Specifically, by the operation of the first controlling device, the recording device can record the record information into the first object area which faces (or corresponds) the recorded area of the first recording layer in which the record information is recorded. Thus, if the record information is recorded into the second recording layer located on the rear side of (or on the farther side of) the first recording layer, viewed from the irradiation side of the laser light, for example, the laser light is irradiated through the first recording layer in which the record information is already recorded. In other words, there is little or no need to record the record information into the second recording layer by irradiating thereon the laser light through the first recording layer in which the record information is unrecorded yet. Therefore, without changing the condition of the laser light to be irradiated, it is possible to properly record the record information into the second recording layer. Thus, it is possible to obtain good recording features in the second recording layer. It is obvious that the record information can be properly recorded into the first recording layer, regardless of the recording state of the second recording layer.

In addition, by the operation of the second controlling device, the record information is recorded into the second object area of the second recording layer which faces the unrecorded area of the first recording layer smaller than the predetermined width. More specifically, it is judged whether or not the width of the unrecorded area existing on the first recording layer (specifically, a width in the radial direction of the information recording medium, a width in a direction parallel or perpendicular to the travel direction of the recording of the record information, or the like) is less than (or equal to) the predetermined width (e.g. a beam radius of the laser light on the first recording layer when the laser light is focused on the second recording layer, as described later). As a result, if the width of the unrecorded area is less than (or equal to) the predetermined width, by the operation of the second controlling device, the record information is recorded into the second object area of the second recording layer which faces the unrecorded area, even there is the unrecorded area in the first recording layer. Namely, according to the control of the first controlling device, the record information is not recorded into the second object area of the second recording layer which faces the unrecorded area of the first recording layer; however, it is possible to record the data even into the second object area by combining the control performed by the second controlling device. Thus, there is such an advantage that the recording capacity of the second recording layer can be effectively used. Even if the data is recorded into the second object area of the second recording layer which faces the unrecorded area of the first recording layer, that does not cause a major change in transmittance of the laser light which passes through the first recording layer, as described later in detail. Namely, the laser light irradiated through the recorded area and the laser light irradiated through the unrecorded area do not have a difference in performance, which may cause a great difference in the recording quality of the record information. Therefore, the reproduction quality of the record information recorded in the second object area can realize a good value to a degree to substantially regard it as the reproduction quality of the record information recorded in the first object area.

Consequently, according to the information recording apparatus of the present invention, it is possible to properly record the record information into the second recording layer, and to use the recording capacity of the second recording layer, more effectively.

In one aspect of the information recording apparatus of the present invention, it is further provided with a third controlling device for controlling the recording device to record the record information while preparing the unrecorded area having a width less than the predetermined width if recording the record information into the first recording layer while preparing the unrecorded area following the recorded area.

In this aspect, if it is necessary to prepare the unrecorded area in the first recording layer, the unrecorded area having the width less than the predetermined width (e.g. the beam radius of the laser light) is prepared by the operation of the third controlling device. In other words, there is no chance to prepare the unrecorded area having a width greater than the predetermined width. Therefore, even if the record information is recorded into the second object area of the second recording layer which faces the unrecorded area, that does not cause a major change in transmittance of the laser light which transmits the first recording layer. Therefore, the reproduction quality of the record information recorded in the second object area can realize a good value to a degree to substantially regard it as the reproduction quality of the record information recorded in the first object area of the second recording layer which faces the recorded area. Thus, it is possible to preferably record the record information even into the second object area. In particular, the unrecorded area prepared in this aspect has the width less than the predetermined width, so that it is unnecessary to judge the inequality of the width of the unrecorded area, as described above. Therefore, it is possible to receive the above-mentioned various benefits by the simpler operation.

Moreover, the unrecorded area with the width greater than the predetermined width is not prepared, so that it is possible to preferably record the record information over substantially the entire surface of the second recording layer in the end. Therefore, it is possible to use the recording capacity of the information recording medium, more effectively.

In another aspect of the information recording apparatus of the present invention, the predetermined width is a numerical value determined by a recording unit of the record information.

According to this aspect, the operation of the second controlling device is performed on the basis of the numeral value which is fixed or variable in one information recording medium. In particular, even if the width of the unrecorded area is not actually measured, the above-mentioned judgment can be performed on the basis of the recording unit (or data size, data capacity, or the like) of the record information which is easily recognized by the information recording apparatus. Therefore, it is possible to judge whether or not the width of the unrecorded area is less than the predetermined width, relatively easily.

In another aspect of the information recording apparatus of the present invention, the predetermined width is a numerical value determined depending on a radial position of the information recording medium.

According to this aspect, the operation of the second controlling device is performed on the basis of the numerical value which varies, as occasion demands, depending on the radial position, as the predetermined value. For example, the above-mentioned judgment operation can be preferably performed even on the information recording medium on which the data size of the record information recordable in a unit area varies depending on the recording position, as in a Constant Linear Velocity (CLV) recording method.

In another aspect of the information recording apparatus of the present invention, the predetermined width corresponds to a size of a beam radius of the laser light on the first recording layer in the case that the second recording layer is irradiated with the laser light.

According to this aspect, as described later, in the laser light irradiated through the recorded area and the laser light irradiated through the unrecorded area, there is no major change in transmittance. Thus, the both lasers do not have a difference in performance, to a degree to cause a great difference in the recording quality of the record information. Therefore, the reproduction quality of the record information recorded in the second object area can realize a good value to a degree to substantially regard it as the reproduction quality of the record information recorded in the first object area.

In this aspect, the numerical value may be obtained by a table or a relational expression for indicating a correlation between a radial position of the information recording medium and the numerical value expressed by the recording unit.

According to this aspect, it is possible to obtain or recognize the numerical value which varies as occasion demands, by using the table or the relational expression (or a function or the like), relatively easily.

In an aspect of the information recording apparatus in which the predetermined width is the numerical value determined by the recording unit of the record information, the information recording medium has a record track on which the record information is recorded and which is distributed concentrically or spirally, and the numerical value is a data size of the record information which can be recorded onto the record track which is included in the predetermined width, at least partially.

By such a construction, it is possible to preferably judge whether or not the width of the unrecorded area is less than the predetermined width. Namely, if the data size of the record information which can be recorded in the entire record track included in the predetermine width at least partially on the first recording layer is greater than the data size of the record information which can be recorded in the unrecorded area, it is possible to judge that the width of the unrecorded area is less than the predetermined width.

In another aspect of the information recording apparatus of the present invention, it is further provided with a first storing device for storing therein size information for indicating the numerical value.

According to this aspect, the above-mentioned judgment can be preferably performed with reference to the size information. Moreover, it may be constructed to store therein size information for indicating the predetermined width.

In another aspect of the information recording apparatus of the present invention, the recording device records position information for indicating a position of the unrecorded area, onto the information recording medium.

According to this aspect, it is possible to recognize the position of the unrecorded area (moreover, the data size and width of the unrecorded area or the like), relatively easily, with reference to the position information. Therefore, it is possible to preferably perform the above-mentioned judgment operation.

In another aspect of the information recording apparatus of the present invention, it is further provided with a fourth controlling device for controlling the recording device to record the record information while preparing a plurality of unrecorded areas, each of which has a width less than the predetermined width, if recording the record information into the first recording layer while preparing the unrecorded area which has a width is greater than the predetermined width, following the recorded area.

According to this aspect, there is no chance to prepare the unrecorded area with the width greater than the predetermine width in the first recording layer. Therefore, considering that the record information is recorded in the entire first recording layer, the information recording apparatus can preferably record the record information into the second recording layer.

In this aspect, the record information may be recorded such that a width between one unrecorded area and another unrecorded area, prepared by control of the fourth controlling device, has a size greater than the predetermined width.

In another aspect of the information recording apparatus of the present invention, the first controlling device controls the recording device to record the record information into an object area portion other than at least one portion of an edge portion of the first object area.

According to this aspect, it is possible to record the record information into the object area portion as being a recording area which is almost one size smaller than the recorded area of the first recording layer in which the record information is recorded. Thus, even if the first and second recording layers do not properly correspond to each other (e.g. even if an eccentricity or the like occurs), it is possible to irradiate the object area portion as being the one size smaller recording area, with the laser light through the first recording layer in which the record information is recorded. This is because even if a positional error occurs between the first and second recording layers or even if a positional error occurs due to the lack of the proper association of the recording areas which have the same address or the same track in the both recording layers, it is possible to eliminate the influence of the error by removing the edge portion.

In this aspect, the second controlling device controls the recording device to record the record information into the at least one portion which is adjacent to the second object area.

By such a construction, even if the record information is recorded in the object area portion other than the edge portion by the operation of the first controlling device, it is possible to preferably record the record information into the edge portion. Moreover, even if the record information is recorded into the edge portion by the operation of the second controlling device, the record information is recorded in the first recording layer which faces the edge portion and in the velocity thereof, and there is the unrecorded area having the width less than the beam radius. Thus, there is no chance to especially adversely affect the reproduction quality of the record information. By this, it is possible to use the recording capacity of the second recording layer, more effectively.

The above object of the present invention can be also achieved by an information recording method in an information recording apparatus, said information recording apparatus provided with a recording device for recording record information onto an information recording medium provided with: a first recording layer on which the record information is recorded by irradiating thereon laser light; and a second recording layer on which the record information is recorded by irradiating thereon the laser light through the first recording layer, said information recording method provided with: a first controlling process of controlling said recording device to record the record information into a first object area which is a recording area of the second recording layer which faces a recorded area of the first recording layer in which the record information is already recorded, if the record information is recorded into the second recording layer; a judging process of judging whether or not a width of an unrecorded area of the first recording layer whose both ends are adjacent to the recorded area is less than a predetermined width; and a second controlling process of controlling said recording device to record the record information into a second object area which is a recording area of the second recording layer which faces the unrecorded area, if it is judged in the judging process to be less than the predetermined width.

According to the information recording method of the present invention, it is possible to receive the same various benefits as in the above-mentioned information recording apparatus of the present invention.

Incidentally, in response to the various aspects of the first information recording apparatus of the present invention described above, the first information recording method of the present invention can adopt various aspects.

(Computer Program)

The above object of the present invention can be also achieved by a computer program for record control to control a computer provided for the above-mentioned information recording apparatus (including its various aspects), to make the computer function as at least one portion of the recording device, the first controlling device and the second controlling device.

According to the computer program of the present invention, the above-described information recording apparatus of the present invention can be relatively easily realized as a computer reads and executes the second computer program from a program storage device, such as a ROM, a CD-ROM, a DVD-ROM, and a hard disk, or as it executes the computer program after downloading the program through a communication device.

Incidentally, in response to the various aspects of the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the recording device, the first controlling device, and the second controlling device.

According to the computer program product of the present invention, the above-described information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-described information recording apparatus.

These effects and other advantages of the present invention become more apparent from the following embodiments.

As explained above, the information recording apparatus of the present invention is provided with: the recording device; the first controlling device; and the second controlling device. Therefore, it is possible to properly record the record information into the second recording layer, and to use the recording capacity of the second recording layer, more effectively.

BRIEF DESCRIPTION OF DRAWINGS

FIG. 1 are a substantial plan view showing the basic structure of an optical disc having a plurality of recording areas in an embodiment of an information recording medium of the present invention, and a schematic cross sectional view of the optical disc and a corresponding conceptual diagram showing a recording area structure in the radial direction.

FIG. 2 is a block diagram conceptually showing the basic structure of an information recording apparatus in an embodiment of the present invention.

FIG. 3 is a flowchart conceptually showing an entire flow of a first operation example by the information recording apparatus in the embodiment.

FIG. 4 is a data structural diagram conceptually showing one procedure in an aspect in which the data is recorded onto an optical disc of an opposite track path type by the first operation example by the information recording apparatus in the embodiment.

FIG. 5 is a data structural diagram conceptually showing another procedure in the aspect in which the data is recorded onto the optical disc of the opposite track path type by the first operation example by the information recording apparatus in the embodiment.

FIG. 6 is a data structural diagram conceptually showing another procedure in the aspect in which the data is recorded onto the optical disc of the opposite track path type by the first operation example by the information recording apparatus in the embodiment.

FIG. 7 is an explanatory diagram conceptually showing a change in transmittance in a L0 layer of laser light if the width of an unrecorded area is less than a beam spot radius.

FIG. 8 is an explanatory diagram conceptually showing a change in transmittance in the L0 layer of the laser light if the width of the unrecorded area is greater than the beam spot radius.

FIG. 9 is an explanatory diagram conceptually showing a recording area provided with groove tracks on which the beam spot of the laser light crosses or is irradiated.

FIG. 10 are lists conceptually showing size information used by the information recording apparatus in the embodiment.

FIG. 11 is a data structural diagram conceptually showing one procedure in an aspect in which the data is recorded onto an optical disc of a parallel track path type by the operation of the information recording apparatus in the embodiment.

FIG. 12 is a data structural diagram conceptually showing another procedure in the aspect in which the data is recorded onto the optical disc of the parallel track path type by the operation of the information recording apparatus in the embodiment.

FIG. 13 is a data structural diagram conceptually showing an aspect in which the data is recorded onto the optical disc by a second operation example by the information recording apparatus in the embodiment.

FIG. 14 is a data structural diagram conceptually showing an aspect in which the data is recorded onto the optical disc by a second operation example by the information recording apparatus in the embodiment.

DESCRIPTION OF REFERENCE CODES

100 Optical disc
102, 112 Lead-in area
105, 115 Data recording area
108, 118 Lead-out area
109, 119 Middle area
116 Unrecorded area
120 Size information
300 Information recording apparatus
352 Optical pickup
354 CPU
355 Memory
α Eccentricity
d Width of unrecorded area in the radial direction
r Beam spot radius

BEST MODE FOR CARRYING OUT THE INVENTION

Hereinafter, the best mode for carrying out the present invention will be discussed in order for each embodiment, with reference to the drawings.

Embodiments of the present invention will be explained hereinafter with reference to the drawings. Incidentally, in the embodiments below, explanation proceeds while a beam spot radius is exemplified as one specific example of the "predetermined width" of the present invention, wherein the beam spot is formed on the L0 layer (the first recording layer) when the laser light is focused on the L1 layer (the second recording layer). It is obvious that the "predetermined width" of the present invention is not limited to the beam spot radius.

(Embodiment of Information Recording Medium)

At first, with reference to FIG. 1, an information recording medium onto which the data is recorded by an information recording apparatus in the embodiment of the present invention will be explained. FIG. 1(a) is a substantial plan view showing the basic structure of an optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 101 as being the center; a lead-in area 102 (112) or a lead-out area 118; a data recording area 105 (115); and a lead-out area 108 (118) or a middle area 109 (119). Then, recording layers or the like are laminated on a transparent substrate 110, for example. In each recording area of the recording layers, tracks such as groove tracks and land tracks are alternately placed, spirally or concentrically, with the center hole 101 as the center. Moreover, on the track, data is divided by a unit of ECC block and recorded. The ECC block is a data management unit by a pre format address, in which an error correction of the data to be recorded can be performed.

Incidentally, the present invention is not particularly limited to the optical disc having the three areas as described above. For example, even if the lead-in area 102 (112) and the lead-out area 108 (118) or the middle area 109 (119) do not exist, a data structure explained below can be constructed. Moreover, as described later, the lead-in area 102 (112) and the lead-out area 108 (118) or the middle area 109 (119) may be further segmentized.

Particularly, the optical disc 100 in the embodiment, as shown in FIG. 1(*b*), has such a structure that a L0 layer and a L1 layer, which constitute one example of the "first and second recording layers" of the present invention, respectively, as described later, are laminated on the transparent substrate 110. Upon the recording and reproduction of such a two-layer type optical disc 100, the data recording/reproduction in the L0 layer or the L1 layer is performed, depending on which recording layer has the focus position of laser light LB, irradiated from the lower side to the upper side in FIG. 1(*b*).

Moreover, the optical disc 100 in the embodiment is not limited to a two-layer, single-sided type, i.e., a dual layer type, but may be a two-layer, double-sided type, i.e. a dual layer, double-sided type. Furthermore, the optical disc 100 in the embodiment is not limited to the optical disc having the two recording layers, as described above, but may be an optical disc of a multilayer type which has three or more layers.

Incidentally, the recording or reproduction procedure of the two-layer type optical disc in an opposite track path type and a parallel track path type and the data structure of each layer will be described later.

(Embodiment of Information Recording Apparatus)

Next, with reference to FIG. 2 to FIG. 14, the embodiment of an information recording apparatus of the present invention will be explained.

(1) Basic Structure

Firstly, with reference to FIG. 2, the basic structure of the information recording apparatus in the embodiment will be explained. FIG. 2 is a block diagram conceptually showing the basic structure of the information recording apparatus in the embodiment.

An information recording apparatus 300 is provided with: the optical disc 100; a spindle motor 351; an optical pickup 352; a signal recording/reproducing device 353; a CPU (drive control device) 354; a memory 355; a data input/output control device 356; a Laser Diode (LD) driver 358; and a bus 357.

The spindle motor 351 is intended to rotate and stop the optical disc 100, and operates in accessing the optical disc 100. More specifically, the spindle motor 351 is constructed to rotate and stop the optical disc 100 at a predetermined speed while receiving spindle servo by a not-illustrated servo unit or the like.

The optical pickup 352 is one specific example of the "recording device" of the present invention. The optical pickup 352 performs the recording/reproducing with respect to the optical disc 100, and is provided with a laser diode, a lens and the like. More specifically, the optical pickup 352 irradiates the optical disc 100 with a light beam, such as laser light, as reading light with a first power upon reproduction, and as writing light with a second power upon recording, with it modulated.

The signal recording/reproducing device 353 performs the recording with respect to the optical disc 100 by controlling the spindle motor 351 and the optical pickup 352. More specifically, the signal recording/reproducing device 353 may be constructed to reproduce the data recorded on the optical disc 100.

The CPU (drive control device) 354 is one specific example of the "first controlling device", the "second controlling device", the "third controlling device", and the "fourth controlling device" of the present invention. The CPU 354 is connected to the signal recording/reproducing device 353 and the memory 355 via the bus 357, and controls the entire operation of the information recording apparatus 300 by giving an instruction to each constitutional element. In general, software for operating the CPU 354 is stored in the memory 355.

The memory 355 is used in the whole data processing on the information recording apparatus 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device; a buffer used for compression/extension (or decoding/encoding) of video data; a Random Access Memory (RAM) area into which a parameter required for the operation of a program or the like is stored; and the like.

On the data input/output control device 356, the data to be recorded onto the optical disc 100 is inputted from external equipment or the like. Then, the data input/output control device 356 outputs the inputted data to the signal recording/reproducing device 353 through the bus 357. Incidentally, if the data recorded on the optical disc 100 can be reproduced, the data input/output control device 356 may be constructed to output the reproduced data to external output equipment, such as a liquid crystal display.

The LD driver 358 oscillates the laser diode or the like of the optical pickup 352 at a predetermined frequency, to thereby control the laser light irradiated from the optical pickup 352.

The information recording apparatus 300 in the embodiment, explained with reference to FIG. 2, is also an embodiment of an information recording/reproducing apparatus. Namely, the information recording apparatus 300 can reproduce the recorded data by the operation of the signal recording/reproducing device 353 (e.g. a head amplifier, a Radio Frequency (RF) detector, or the like). The information recording apparatus 300 in the embodiment includes the function of an information reproducing apparatus or the function of the information recording/reproducing apparatus.

(2) First Operation Example

Next, with reference to FIG. 3, a first aspect of the recording operation by the information recording apparatus 300 in the embodiment will be explained. FIG. 3 is a flowchart conceptually showing an entire flow of the first operation example.

As shown in FIG. 3, at first, the optical disc 100 is loaded onto the information recording apparatus 300 and disc check is performed (step S101). Here, for example, various control information or management information required for the recording of the data is obtained, or Optimum Power Control (OPC) processing or the like is performed. Alternatively, it may be judged whether or not the loaded optical disc 100 is a dual-layer type optical disc.

Then, the data is recorded into each recording layer. In the embodiment, as a general rule, at first, the data is recorded into a recording area of the L0 layer, and then, the data is recorded into a recording area of the L1 layer which faces the recording area of the L0 layer in which the data is recorded. Namely, in recording the data into the L1 layer, it is judged whether or not the data is already recorded in the facing recording area of the L0 layer, under the control of the CPU 354, before the actual recording of the data into the L1 layer (step S103). In other words, it is judged whether or not the data is already recorded in the recording area of the L0 layer which faces the recording area of the L1 layer into which the data is to be recorded.

As a result of the judgment, if it is judged that the data is already recorded in the facing recording area of the L0 layer (the step S103: Yes), the data is recorded into the recording area of the L1 layer which faces the recording area of the L0 layer in which the data is already recorded (i.e. a recorded area) (step S104).

On the other hand, if it is judged that the data is not recorded in the facing recording area of the L0 layer (the step S103: No), then, under the control of the CPU 354, it is judged whether or not a width d of the recording area of the L0 layer in which the data is not recorded yet (i.e. an unrecorded area 116 described later) in the radial direction of the optical disc 100 (or a width in a direction parallel or perpendicular to a recording direction which is the travel direction of the laser light) is less than (or equal to) a beam spot radius r of the laser light on the L0 layer when the laser light LB is focused on the L1 layer (step S105). Incidentally, if not otherwise specified, hereinafter, the "beam spot radius r" means the beam spot radius r of the laser light LB on the L0 layer when the laser light LB is focused on the L1 layer. For example, if the beam spot radius r=36 μm, it is judged whether or not the width d in the radial direction of the unrecorded area 116 is less than (or equal to) 36 μm.

As a result of the judgment, if the width d of the unrecorded area 116 is less than (or equal to) the beam spot radius r (the step S105: Yes), the data is recorded into the recording area of the L1 layer which faces the unrecorded area 116 (step S106). Namely, even if the data is not recorded in the facing recording area of the L0 layer, the data is recorded into the L1 layer.

On the other hand, if the width d of the unrecorded area is not less than (or equal to) the beam spot radius r (the step S105: No), the data is not recorded into the recording area of the L1 layer which faces the unrecorded area 116, and the operational flow goes to step S107.

Then, under the control of the CPU 354, it is judged whether or not the recording of the data is ended (step S107). As a result of the judgment, if it is judged that the recording is not ended (the step S107: No), the recording of the data onto the optical disc 100 is continued.

On the other hand, if it is judged that the recording is ended (the step S107: Yes), the recording operation is ended, and finalize processing may be performed if needed, or the optical disc 100 may be ejected from the information recording apparatus 300.

Now, the actual recording of the data onto the optical disc 100 will be explained in detail, with reference to FIG. 4 to FIG. 6. FIG. 4 to FIG. 6 are data structural diagrams conceptually showing an aspect in which the data is recorded onto the optical disc 100 by the information recording apparatus 300 in the embodiment. Incidentally, the explanation is given by specifically using the optical disc 100 of the opposite track path type.

As shown in FIG. 4, by the operation of the information recording apparatus 300 in the embodiment, at first, the data is recorded into a desired recording area of the L0 layer. Namely, the data is recorded into a data recording area 105a as shown by (1) in FIG. 4.

Then, if the data is recorded into the L1 layer, the data is recorded into the recording area of the L1 layer which faces the recording area of the L0 layer in which the data is already recorded. Namely, the data is recorded into a data recording area 115a as shown by (2) in FIG. 4. The data recording area 115a constitutes one specific example of the "first object area" of the present invention. It is preferable to record the data so as to shorten each of the both ends of the data recording area 116a from respective one of ends of the data recording area 105a by a width that corresponds to an eccentricity α of the optical disc 100. To explain more specifically, it is assumed that the data is recorded in the data recording area 105a from a N1 track to N2 track, in the L0 layer. It is also assumed that the eccentricity of the optical disc 100 has a width in the radial direction which corresponds to a tracks. At this time, in the L1 layer, under the control of the CPU 354, the data is recorded into the data recording area 115a from a N1+α track to a N2−α track. In addition, it is preferable to record address information for indicating a recording start position and a recording end position or the like in the data recording areas 105a and 115a, into a Recording Management Area (RMA) of the lead-in area 102 or the like, for example. The same is true for a data recording area 105b, 115b and the like described below.

For the following reason, a margin (i.e. one specific example of the "edge portion" of the present invention) with a width corresponding to the eccentricity α is prepared. The margin is the recording area into which the data may not be recorded. Namely, if there is an eccentricity between the L0 layer and the L1 layer, the recording areas with the same track number in the both recording layers do not always correspond to each other, viewed from the optical pickup 352. Therefore, if the data is recorded into another track of the L1 layer with the same track number as that of one track of the L0 layer in which the data is already recorded, the laser light is not necessarily irradiated through the one track. Preparing the margin corresponding to the eccentricity α prevents such a situation. In short, it can be said that this is one specific method to ensure such a situation that the data is recorded in the recording area of the L1 layer which faces the L0 layer in which the data is already recorded, more certainly.

As described above, if the data is recorded into the L1 layer by preparing the margin with the width corresponding to the eccentricity α, it is possible to properly record the data into the L1 layer corresponding to the L0 layer in which the data is already recorded. Namely, it is possible to record the data into the L1 layer by the laser light irradiated through the L0 layer in which the data is already recorded. However, it is not always necessary to prepare the margin with the width corresponding to the eccentricity α.

The width of the eccentricity α may be detected by the operation of a not-illustrated eccentricity detector, for example. Moreover, regardless of the operation of the eccentricity detector, the maximum permissible eccentric amount may be regarded as the eccentricity α, artificially. For example, in a DVD as being one specific example of the optical disc 100, the maximum permissible eccentric amount is defined as 70 μm at maximum by a standard book. Therefore, the data may be recorded in a recording area of the L1 layer defined by a α=70 μm. Alternatively, a width corresponding to a predetermined margin may be added to the eccentric amount. For example, if layer jump is performed from the L0 layer to the L1 layer, it is not always possible to jump to a corresponding position, depending on the accuracy of the spindle motor 351, focus servo system, tracking servo system or the like. Therefore, an error amount by the layer jump may be regarded as the margin.

Then, if the data is recorded into the L0 layer again, the data is recorded following the previously recorded data (i.e. the data recorded in the data recording area 105a). At this time, as shown in FIG. 5, a space area (i.e. the unrecorded area 116) with a predetermined width d is prepared from behind the data recording area 105a, and then, the data is recorded. Namely, the data is recorded into the data recording area 105b (a recording area shown by (3) in FIG. 5) having the unrecorded area 116 with the width d between the data recording area 105b and the data recording area 105a. This unrecorded area 116 is used as a reserved R zone or the like, into which various control information or the like is recorded in the finalize processing or the like of the optical disc 100. Alternatively, when the data is recorded with the data recording area 105 divided into a plurality of blocks, the unrecorded area 116 may be used as a border-in area (or a border-out area, an interlayer buffer area, or the like) provided for each block.

Then, if the data is recorded into the L1 layer again, the data is recorded into the data recording area 115b, following the previously recorded data (i.e. the data recorded in the data recording area 115a). At this time, on the outer circumferential side of the data recording area 115b, it is necessary to prepare the margin whose width is the width of the eccentricity α. On the inner circumferential side, if the width d of the unrecorded area 116 in the radial direction is less than the beam spot radius r of the laser light LB on the L0 layer, it is assumed that the data is recorded in the unrecorded area 116, and the data is also recorded into the data recording area of the L1 layer which faces the unrecorded area 116. Namely, as shown in FIG. 5, the data is recorded, continuously from the data recording area 115a (i.e. without preparing the margin with the width corresponding to the width of the eccentricity α). Incidentally, a recording area in the L1 layer which faces the unrecorded area 116 (a recording area 117 shown by a mesh portion in FIG. 5) constitutes one specific example of the "second object area" of the present invention.

At this time, the width d of the unrecorded area 116 can be calculated on the basis of the recording start position of the data recording area 105b, the recording end position of the data recording area 105a or the like recorded in the recording management area. Moreover, the beam spot radius r can be calculated on the basis of the numerical aperture NA of the optical pickup 352, the wavelength λ of the laser light LB, the distance D between the L0 layer and the L1 layer and the refractive index n thereof (i.e. materials of the optical disc 100 or the like). The beam spot radius r is not necessarily calculated at each time of the judgment operation (i.e. the operation of step S105 in the FIG. 3). However, it may be calculated, mathematically and statistically, in consideration of each parameter at the time of manufacture of the information recording apparatus 300, and the judgment operation may be performed on the basis of the beam spot radius r calculated in this manner.

On the other hand, if the width d of the unrecorded area 116 in the radial direction is not less than the beam spot radius r of the laser light LB on the L0 layer, as shown in FIG. 6, the data is not recorded into the recording area 117 of the L1 layer which faces the unrecorded area 116 nor the margins with the width corresponding to the width of the eccentricity α, located on the both sides of the recording area 117 of the L1 layer.

After the recording of the data into the data recording areas 105 and 115 is ended, various control information for controlling the recording or reproduction of the data, dummy data (e.g. "00h" data, etc.), or the like is recorded into the lead-in area 102 and the lead-out area 118, and the middle areas 109 and 119. Even in this case, after the control information or the like is recorded into the lead-in area 102 of the L0 layer, the control information or the like is preferably recorded into the lead-out area 118 of the L1 layer which faces the data recording area of the L0 layer (i.e. the lead-in area 102 or the like) in which the control information or the like is recorded. Moreover, after the control information or the like is recorded into the middle area 109 of the L0 layer, the control information or the like is preferably recorded into the middle area 119 of the L1 layer which faces the data recording area of the L0 layer (i.e. the middle area 109 or the like) in which the control information or the like is recorded. Furthermore, the various control information or the like may be recorded, or the dummy data or the like may be recorded into the unrecorded area 116 or the like if needed.

Incidentally, in the case of an optical disc on which the control information or the like is pre-recorded in advance in the lead-in area 102 (particularly, near a border with the data recording area 105a), the data may be recorded without consideration of the eccentricity α, on the inner circumferential side of the data recording area 115a of the L1 layer. In the case of an optical disc on which the control information or the like is pre-recorded in advance in the middle area 109 (particularly, near a border with the data recording area 105b), the data may be recorded without consideration of the eccentricity α, on the outer circumferential side of the data recording area 115b of the L1 layer.

For the following reason, it is judged whether or not to record the data into the recording area 117 of the L1 layer which faces the unrecorded area 116, depending on the width d of the unrecorded area 116 in the L0 layer, as describe above. The reason will be explained with reference to FIG. 7 and FIG. 8. FIG. 7 is an explanatory diagram conceptually showing a change in transmittance in the L0 layer with respect to the laser light LB if the width d of the unrecorded area 116 is less than the beam spot radius r. FIG. 8 is an explanatory diagram conceptually showing a change in transmittance in the L0 layer with respect to the laser light LB if the width of the unrecorded area 116 is greater than the beam spot radius r.

As shown in FIG. 7, if the width d of the unrecorded area 116 is less than the beam spot radius r, that does not cause a major change of the transmittance with respect to the laser light LB. Namely, by irradiating the unrecorded area 116 with the laser light LB, even if the transmittance in the L0 layer with respect to the laser light LB is reduced, the degree of the reduction of the transmittance is small because of the small width d of the unrecorded area 116. Namely, the transmittance in the L0 layer with respect to the laser light LB is not reduced much enough to adversely affect the recording of the data (e.g. to adversely affect such as changing an optimum power or the like, or to deteriorate various reproduction qualities). In other words, if the width d of the unrecorded area 116 is less than the beam spot radius r, the transmittance in the L0 layer with respect to the laser light LB when transmitting the unrecorded area 116 is reduced only to a degree to substantially regard it as the transmittance in the L0 layer with respect to the laser light LB when transmitting the recorded area. As a result, a RF signal obtained by receiving the reflected light of the laser light LB irradiated through the unrecorded area 116 is substantially the same as that obtained by receiving the reflected light of the laser light LB irradiated through the recorded area in which the data is already recorded.

On the other hand, as shown in FIG. 8, if the width d of the unrecorded area 116 is greater than the beam spot radius r, that causes a major change of transmittance. Namely, by irradiating the unrecorded area 116 having the width d greater than the beam spot radius r with the laser light LB, the transmittance in the L0 layer with respect to the laser light LB is greatly reduced, and is reduced much enough to adversely affect the recording of the data into the L1 layer. As a result, it can be no longer said that a RF signal obtained by receiving the reflected light of the laser light LB irradiated through the unrecorded area 116 is substantially the same as that obtained by receiving the reflected light of the laser light LB irradiated through the recorded area in which the data is already recorded. To that degree, the waveform of the RF signal is adversely affected. Thus, in this case, the data is not recorded into the recording area of the L1 layer which faces the unrecorded area 116.

Summarizing the above, according to the information recording apparatus 300 in the embodiment, it is possible to record the data into the L1 layer by the laser light LB irradiated through the L0 layer in which the data is already recorded.

In general, in the dual-layer type optical disc, it is known that the quality of the data recorded in the L1 layer varies depending on whether the data is recorded into the L1 layer by the laser light LB irradiated through the recording area of the L0 layer in which the data is already recorded or the data is recorded into the L1 layer by the laser light LB irradiated through the recording area of the L0 layer in which the data is unrecorded. Namely, in the case that the data is recorded by the laser light LB irradiated in the same laser condition, there is such a technical problem that even if good recording features are obtained in either one of the cases, it is not always possible to obtain good recording features in the other case, as well.

However, according to the information recording apparatus 300 in the embodiment, it is possible to record the data into the L1 layer by the laser light LB irradiated through the L0 layer in which the data is already recorded. This can solve the above-mentioned problem. As a result, it is possible to properly record the data into an arbitrary recording area of the L1 layer, with an optimum recording laser power in the case where the data is recorded into the L1 layer through the L0 layer in which the data is already recorded. In particular, it is unnecessary to change the recording laser power and it is enough to record the data while judging the recording status of the L0 layer, so that there is such an advantage that the recording operation itself is simplified. In addition, even if the recorded data is reproduced, it is also possible to obtain good reproduction features (e.g. a good asymmetry value, a good jitter value, a good modulated amplitude, a good reproduction error rate, or the like). Moreover, since the data is recorded into the L1 layer by preparing the margin with the width corresponding to the width of the eccentricity $\alpha$ in consideration of the influence of the eccentricity $\alpha$, it is possible to record the data, more properly, even in an arbitrary recording area of the L1 layer.

Furthermore, according to the information recording apparatus 300 in the embodiment, even if there is the unrecorded area 116 in the L0 layer, it is possible to record the data into the recording area 117 of the L1 layer which faces the unrecorded area 116, depending on the size of the width d of the unrecorded area 116 in the radial direction. Namely, in the principle, the data is not recorded into the recording area 117 which faces the unrecorded area 116. Moreover, in the principle, the data is not recorded into the margins at the both ends of the recording area 117. However, according to the information recording apparatus 300 in the embodiment, it is possible to record the data even into the recording area 117. Therefore, there is such an advantage that the recording capacity of the L1 layer can be effectively used, which results in an increase in the data capacity of the data which can be recorded on the entire optical disc 100. Even if the data is recorded into the recording area 117 of the L1 layer which faces the unrecorded area 116, the recording operation is not adversely affected, as described above. Namely, even if the data recorded in the recording area 117 of the L1 layer which faces the unrecorded area 116 is reproduced, the reproduction quality thereof (e.g. asymmetry value, a jitter value, or the like) can realize a good value to a degree to substantially regard it as the reproduction quality obtained in reproducing the data recorded in the recording area of the L1 layer which faces the recorded area of the L0 layer.

Moreover, not only in the case where the unrecorded area 116 is provided which is required for the normal recording operation or the like (i.e. the reserved R zone is provided described above), but also in the case where the unrecorded area 116 is unexpectedly generated in the L0 layer due to the operational trouble or the like of the information recording apparatus 300 or similar situations, the size of the width d of the unrecorded area 116 can be judged, and the data can be recorded into the recording area 117 of the L1 layer which faces the unrecorded area 116. Namely, even if such an operational trouble occurs, it is possible to effectively use the recording capacity of the optical disc 100.

Incidentally, in the above-mentioned embodiment, the width d of the unrecorded area 116 and the beam spot radius r are compared, to thereby judge whether or not the data can be recorded into the recording area of the L1 layer which faces the unrecorded area 116. Needless to say, instead of this, a predetermined constant value and the width d of the unrecorded area 116 may be compared, to thereby judge whether or not the data can be recorded into the recording area of the L1 layer which faces the unrecorded area 116. For example, if the width d of the unrecorded area 116 is less than a predetermined constant value of 50 $\mu$m (preferably, less than 20 $\mu$m, and more preferably, less than 10 $\mu$m), it may be judged that the data can be recorded into the recording area of the L1 layer which faces the unrecorded area 116. If the width d of the unrecorded area 116 is greater than or equal to the predetermined constant value of 50 $\mu$m (preferably, greater than or equal to 20 $\mu$m, and more preferably, greater than or equal to 10 $\mu$m), it may be judged that the data cannot recorded into the recording area of the L1 layer which faces the unrecorded area 116. With respect to this predetermined constant value, it is preferable to individually and concretely specify a more proper predetermined constant value, experimentally, empirically, mathematically or theoretically, or by using a simulation or the like, depending on various features of the optical disc 100, such as the material, quality, and size thereof, or various features of the information recording apparatus 300, such as the specification thereof.

Incidentally, in the above-mentioned embodiment, whether or not the data can be recorded into the recording area of the L1 layer which faces the unrecorded area 116 is judged on the basis of the width d of the unrecorded area 116. However, on the actual information recording apparatus 300, it is preferable to perform the judgment, on the basis of the data size of the unrecorded area 116. Namely, if there is a groove track as shown in FIG. 9 and a beam spot is formed thereon, it is preferable to judge whether or not the data size of the unrecorded area 116 is less than the data size of the recording area, constructed from a groove track on which the beam spot crosses or is irradiated (i.e. the groove track shown by a thick line in FIG. 9). More specifically, for example, it is assumed that the beam spot radius is 36 μm, the track pitch of the groove track to record the data thereon is 0.74 μm and the data size of a cycle of track is 32 KB. In this assumption, the data size of the recording area, constructed from the groove track on which the beam spot crosses or is irradiated, is (36/0.74)× 32=1556 KB≈1.5 MB. Therefore, whether or not the data size of the unrecorded area 116 on the L0 layer is less than 1.5 MB may be judged, to thereby judge whether or not the data can be recorded into the recording area 117 of the L1 layer which faces the unrecorded area 116. At this time, as described above, it is preferable to calculate the data size of the unrecorded area 116 by using a predetermined table or function or the like, on the basis of the recording start position of the data recording area 105b, the recording end position of the data recording area 105a and the like recorded in the recording management area. Even if the judgment is performed on the basis of the data size of the unrecorded area 116, this is not different from the judgment which is performed on the basis of the width d of the unrecorded area 116, in the end. In short, this is only a difference in whether the width d of the unrecorded area 116 is directly set as a judgment reference, or the data size which indirectly indicates the width d is set as the judgment reference.

Moreover, in this case, size information 120 may be provided, which indicates the data size of the unrecorded area 116 of the L0 layer which faces the recording area of the L1 layer into which the data can be recorded, as shown in FIG. 10(a) and FIG. 10(b). FIG. 10(a) and FIG. 10(b) are lists, each schematically showing the size information 120.

For example, if it is judged whether or not the data size of the unrecorded area 116 is less than 1.5 MB, size information 120a may be provided as shown in FIG. 10(a). The size information 120a may be recorded in advance in the memory 355, for example. Alternatively, the size information 120a may be obtained through a wired or wireless network, or the like. Alternatively, the size information 120a may be recorded in advance on the optical disc 100.

Alternatively, in an optical disc adopting a Constant Linear Velocity (CLV) recording method or a Zone CLV (ZCLV) recording method, the data size recordable in the recording area having the same width (or the same areal size) varies, depending on a recording position where the data is recorded (e.g. whether it is on the relatively inner circumferential side or on the relatively outer circumferential side) or the like. Therefore, as shown in FIG. 10(b), size information 120b may be provided, which indicates a plurality of data sizes, depending on a position on the recording surface. Namely, in the recording area on the relatively inner circumferential side, shown by addresses of N1 to N2, it is judged whether or not the data can be recorded into the recording area of the L1 layer which faces the unrecorded area 116, on the basis of a numerical value of "1.5 MB". In the recording area on the middle circumferential side, shown by addresses of N2 to N3, it is judged whether or not the data can be recorded into the recording area of the L1 layer which faces the unrecorded area 116, on the basis of a numerical value of "3.0 MB". In the recording area on the relatively outer circumferential side, shown by addresses of N3 to N4, it is judged whether or not the data can be recorded into the recording area of the L1 layer which faces the unrecorded area 116, on the basis of a numerical value of "4.5 MB".

It is obvious that the present invention is not limited to the optical disc 100 of the opposite track path type as described above, but it may be the optical disc 100 of the parallel track path type, as shown in FIG. 11 and FIG. 12. FIG. 11 and FIG. 12 are data structural diagrams conceptually showing an aspect in which the data is recorded onto an optical disc 100a of the parallel track path type by the information recording apparatus 300 in the embodiment.

As shown in FIG. 11, by the operation of the information recording apparatus 300, at first, the data is recorded into a desired recording area of the L0 layer. Namely, the data is recorded into a data recording area 105a as shown by (1) in FIG. 11. Then, if the data is recorded into the L1 layer, the data is recorded into the recording area 115a of the L1 layer which faces the recording area of the L0 layer in which the data is already recorded. Namely, the data is recorded into a data recording area 115a as shown by (2) in FIG. 11. It is preferable to record the data so as to prepare margins at each of the both ends of the data recording area 115a from respective one of ends of the data recording area 105a by a size that corresponds to the eccentricity α of the optical disc 100, as in the above-mentioned data recording in FIG. 4.

Then, if the data is recorded into the L0 layer again, the data is recorded following the previously recorded data (i.e. the data recorded in the data recording area 105a). At this time, as shown in FIG. 12, the unrecorded area 116 with a predetermined width d is prepared from behind the data recording area 105a, and then, the data is recorded. Namely, the data is recorded into a data recording area 105b (a recording area shown by (3) in FIG. 12) having the unrecorded area 116 with the width d between the data recording area 105b and the data recording area 105a.

Then, if the data is recorded into the L1 layer, the data is recorded in the data recording area 115b, following the previously recorded data (i.e. the data recorded in the data recording area 115a). At this time, on the outer circumferential side of the data recording area 115b, it is necessary to prepare the margin whose width is to the width of the eccentricity α. On the inner circumferential side, if the width d of the unrecorded area 116 in the radial direction is less than the beam spot radius r of the laser light LB on the L0 layer, it is assumed that the data is recorded in the unrecorded area 116, and the data is also recorded into the recording area of the L1 layer which faces the unrecorded area 116. Namely, as shown in FIG. 12, the data is recorded, continuously from the data recording area 115a (i.e. without preparing the margin with the width corresponding to the width of the eccentricity α).

On the other hand, if the width d of the unrecorded area 116 in the radial direction is not less than the beam spot radius r of the laser light LB on the L0 layer, the data is not recorded into the recording area 117 of the L1 layer which faces the unrecorded area 116 nor the margins with the width corresponding to the eccentricity α, located on the both sides of the recording area 117 of the L1 layer.

(3) Second Operation Example

Next, with reference to FIG. 13 and FIG. 14, a second operation example by the information recording apparatus 300 in the embodiment will be explained. FIG. 13 and FIG. 14 are data structural diagrams, each conceptually showing an aspect in which the data is recorded onto the optical disc 100 by the second operation example. Incidentally, in the second operation example, the aspect in which the data is recorded onto the optical disc 100 of the opposite track path type will be explained.

As shown in FIG. 13, at first, the data is recorded into the L0 layer. For example, the data is recorded into a data recording area 105a as shown by (1) in FIG. 13. Then, the data is recorded into a data recording area 105b as shown by (2) in FIG. 13. Then, the data is recorded into a data recording area 105c as shown by (3) in FIG. 13. At this time, in order to provide the reserved R zone, the border-in area or the like, for example, unrecorded areas 116a and 116b are prepared, if needed, in the L0 layer, as described above. At this time, particularly in the second operation example, under the control of the CPU 354 as being one specific example of the "forth controlling device" of the present invention, the data is recorded into the L0 layer such that each of a width d1 of the unrecorded area 116a and a width d2 of the unrecorded area 116b is less than the beam spot radius r. In other words, the data recording areas 105a, 105b, and 105c are provided such that each of the width d1 of the unrecorded area 116a and the width d2 of the unrecorded area 116b is less than the beam spot radius r.

Moreover, if it is necessary to provide the unrecorded area 116 having a width x greater than the beam spot radius r, the unrecorded area 116 with the width x is divided into a plurality of unrecorded areas 116 with a width less than the beam spot radius r, under the control of the CPU 354. For example, three divided unrecorded areas 116a, 116b, and 116c are provided, each of which has a width of x/3 less than the beam spot radius r. By this, the width of each of the divided unrecorded areas 116a, 116b and 116c is less than the beam spot radius r, and as a result, it is possible to provide one unrecorded area 116 having the width x greater than the beam spot radius r.

Therefore, according to the second operation example, the unrecorded area 116 with the width d greater than the beam spot radius r no longer exists in the L0 layer. Therefore, if the data is recorded into the L1 layer following the L0 layer, it is possible to continuously record the data into the L1 layer, as shown in FIG. 13, with little consideration or no consideration of the presence of the unrecorded areas 116a and 116b. Namely, it is unnecessary to judge the inequality of the width d of the unrecorded area 116 and the beam spot radius r, as in the first operation example. Therefore, as in the first operation example, it is possible to properly record the data into an arbitrary recording area of the L1 layer, with the optimum recording laser power in the case where the data is recorded into the L1 layer through the L0 layer in which the data is already recorded. At the same time, it is possible to effectively use the recording capacity of the L1 layer. There is also a great advantage that such benefits can be realized by a relatively simple structure and operation, as compared to the first operation example.

Incidentally, even in the second operation example, the aspect of the structure and the operation in the first operation example may be adopted. By this, it is possible to receive the various benefits owned by the first operation example.

In the above-mentioned embodiment, the dual-layer type optical disc is explained as the specific example. The present invention, however, is not limited to the dual-layer type optical disc. Even the multilayer type optical disc having three or more recording layers can receive the above-mentioned various benefits by adopting the same structure.

In the above-mentioned embodiment, the optical disc 100 is explained as one example of the information recording medium, and the recorder related to the optical disc 100 is explained as one example of the information recording apparatus. The present invention, however, is not limited to the optical disc and the recorder thereof, and can be applied to other various high-density-recording or high-transmission-rate information recording media, and the recorders thereof The present invention is not limited to the above-described embodiments, and various changes may be made, if desired, without departing from the essence or spirit of the invention which can be read from the claims and the entire specification. An information recording apparatus, an information recording method, and a computer program for recording control, all of which involve such changes, are also intended to be within the technical scope of the present invention.

INDUSTRIAL APPLICABILITY

The information recording apparatus and the computer program according to the present invention can be applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus for recording record information onto an information recording medium comprising: a first recording layer on which the record information is recorded by irradiating thereon laser light; and a second recording layer on which the record information is recorded by irradiating thereon the laser light through the first recording layer, said information recording apparatus comprising:

a recording device for recording the record information into the first recording layer or the second recording layer by irradiating thereon the laser light, the recording device recording the record information into the second recording layer after the recording device records the record information into the first recording layer, the record information being recorded from an inner circumferential side to an outer circumferential side in the first recording layer and the record information being recorded from an outer circumferential side to an inner circumferential side in the second recording layer;

a first controlling device for controlling said recording device to record the record information into a first object area which is a recording area of the second recording layer which is irradiated with the laser light passing through a recorded area of the first recording layer in which the record information is already recorded; and a second controlling device for controlling said recording device to record the record information into a second object area which is a recording area of the second recording layer which is irradiated with the laser light passing through an unrecorded area smaller than a predetermined width, out of an unrecorded area which are adjacent to the recorded area, wherein the recording device records control information into the unrecorded area after the recording of the record information into the second recording layer is ended.

2. The information recording apparatus according to claim 1, wherein the unrecorded area is a border-in area, and said second controlling device controls said recording device to record the record information into the second object area which is irradiated with the laser light passing through the border-in area.

3. The information recording apparatus according to claim 1, further comprising a third controlling device for controlling said recording device to record the record information while preparing the unrecorded area having a width less than the predetermined width, if recording the record information into the first recording layer while preparing the unrecorded area following the recorded area.

4. The information recording apparatus according to claim 1, wherein the predetermined width is a numerical value determined by a recording unit of the record information.

5. The information recording apparatus according to claim 1, wherein the predetermined width varies depending on a radial position of the information recording medium.

6. The information recording apparatus according to claim 1, wherein the predetermined width corresponds to a size of a beam radius of the laser light on the first recording layer in the case that the second recording layer is irradiated with the laser light.

7. The information recording apparatus according to claim 4, wherein the information recording medium has a record track on which the record information is recorded and which is distributed concentrically or spirally, and the numerical value is a data size of the record information which can be recorded onto the record track which is included in the predetermined width at least partially.

8. The information recording apparatus according to claim 4, further comprising a first storing device for storing therein size information for indicating the numerical value.

9. The information recording apparatus according to claim 1, wherein said recording device records position information for indicating a position of the unrecorded area, onto the information recording medium.

10. The information recording apparatus according to claim 1, further comprising a fourth controlling device for controlling said recording device to record the record information while preparing a plurality of unrecorded areas, each of which has a width less than the predetermined width, if recording the record information into the first recording layer while preparing the unrecorded area which has a width is greater than the predetermined width following the recorded area.

11. The information recording apparatus according to claim 10, wherein the record information is recorded such that a width between one and another unrecorded areas, prepared by control of said fourth controlling device, has a size greater than the predetermined width.

12. The information recording apparatus according to claim 11, wherein said first controlling device controls said recording device to record the record information into an object area portion other than at least one portion of an edge portion of the first object area.

13. The information recording apparatus according to claim 12, wherein said second controlling device controls said recording device to record the record information into the at least one portion which is adjacent to the second object area.

* * * * *